(12) United States Patent
Izuhara

(10) Patent No.: US 10,093,135 B2
(45) Date of Patent: Oct. 9, 2018

(54) PNEUMATIC TIRE

(71) Applicant: TOYO TIRE & RUBBER CO., LTD., Osaka-shi, Osaka (JP)

(72) Inventor: Yuji Izuhara, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 356 days.

(21) Appl. No.: 14/837,362

(22) Filed: Aug. 27, 2015

(65) Prior Publication Data

US 2016/0082786 A1    Mar. 24, 2016

(30) Foreign Application Priority Data

Sep. 19, 2014  (JP) ................. 2014-191040

(51) Int. Cl.
*B60C 5/14*  (2006.01)
*B60C 15/06*  (2006.01)

(52) U.S. Cl.
CPC ............ *B60C 15/0635* (2013.01); *B60C 5/14* (2013.01); *B60C 15/0607* (2013.01); *B60C 2005/145* (2013.01); *B60C 2015/0614* (2013.01); *B60C 2015/0617* (2013.01); *B60C 2015/0678* (2013.01); *B60C 2015/0682* (2013.01)

(58) Field of Classification Search
CPC . B60C 5/14; B60C 2015/145; B60C 15/0607; B60C 2005/145; B60C 5/142; B60C 2005/147; B60C 15/0635
USPC ......................................... 152/510, 541, 543
See application file for complete search history.

(56) References Cited

U.S. PATENT DOCUMENTS 7,172,002 B2 *  2/2007  Ueyoko ............... B60C 5/14
                                             152/510
8,616,255 B2 * 12/2013  Sugimoto ........... B60C 5/14
                                             152/510
(Continued)

FOREIGN PATENT DOCUMENTS

CN          104002618 A      8/2014
JP          04031109 A  *   2/1992
(Continued)

OTHER PUBLICATIONS

English machine translation of JP 4-31109 A, Feb. 3, 1992.*
(Continued)

*Primary Examiner* — Adrienne C. Johnstone
(74) *Attorney, Agent, or Firm* — Westerman, Hattori, Daniels & Adrian, LLP

(57) ABSTRACT

A pneumatic tire includes a carcass ply wound up from an inner side to an outer side around bead cores, chafers wound up from an outer side to an inner side around the bead cores, and an inner liner rubber which is arranged in an inner side of the carcass ply, wherein a squeegee rubber having a higher modulus than the inner liner rubber is provided closer to the inner liner rubber side than the chafers between the carcass ply and the inner liner rubber, and the squeegee rubber is arranged so as to cover inside wound-up ends of the chafers, and is provided with a thick portion which is thicker than the inner liner rubber, and thin portions which are arranged respectively in an inner side and an outer side in the tire diametrical direction of the thick portion and are thinner than the inner liner rubber.

1 Claim, 3 Drawing Sheets

(56) References Cited

U.S. PATENT DOCUMENTS

| | | | | |
|---|---|---|---|---|
| 8,905,102 B2* | 12/2014 | Nishio | ............... | B60C 15/0607 |
| | | | | 152/541 |
| 2006/0090830 A1* | 5/2006 | Jardine | .................... | B60C 5/14 |
| | | | | 152/510 |
| 2008/0093001 A1* | 4/2008 | Ono | ......................... | B60C 5/14 |
| | | | | 152/510 |
| 2013/0037196 A1* | 2/2013 | Kodama | ............. | B60C 15/0607 |
| | | | | 152/541 |

FOREIGN PATENT DOCUMENTS

| | | | |
|---|---|---|---|
| JP | 6-183224 | A | 7/1994 |
| JP | 7-195918 | A | 8/1995 |
| JP | 2001-206006 | A | 7/2001 |
| JP | 2005-297927 | A | 10/2005 |
| JP | 2013-18816 | A | 1/2013 |
| JP | 2014-162283 | A | 9/2014 |

OTHER PUBLICATIONS

Office Action dated Dec. 5, 2016, issued in counterpart Chinese Patent Application No. 201510549118.4, with English translation. (13 pages).

Office Action dated Nov. 28, 2017, issued in counterpart Japanese Application No. 2014-191040, with English translation. (12 pages).

* cited by examiner

Prior Art

PNEUMATIC TIRE

BACKGROUND OF THE INVENTION

Field of the Invention

The present invention relates to a pneumatic tire having a carcass ply which is wound up to an outer side from an inner side around a bead core, and a chafer which is wound up to the inner side from the outer side around the bead core and is arranged so as to wrap the carcass ply.

Description of the Related Art

Conventionally, in a pneumatic tire which is particularly used in a heavy vehicle such as an industrial vehicle and a construction vehicle, there has been a risk that a trouble such as separation occurs beginning at a wound-up end of the carcass ply which is wound up around the bead core. As a result, a reinforcing member called as a chafer has been generally arranged along the carcass ply, as disclosed in the following Patent Documents 1 to 3. However, even in the case that the chafer is arranged, durability may be deteriorated due to a protruding deformation of a bead portion, and there has been room for further improvement.

FIG. 3 is a diagram illustrating a protruding deformation of a bead portion. In a tire at the time of traveling, a side wall portion greatly bends by application of an internal pressure and a load, and a bead portion 1 deforms while protruding outward along a rim flange 91 as shown in the drawing. In the case that such a protruding deformation is repeated according to rolling of the tire, an inner liner rubber 5 constructing a tire inner surface is elongated, a great strain acts on a wound-up end 62E in a tire inner surface side of a chafer 6, and a crack tends to be generated beginning at the strain.

PRIOR ART DOCUMENT

Patent Document

Patent Document 1: JP-A-2005-297927
Patent Document 2: JP-A-7-195918
Patent Document 3: JP-A-2013-18816

SUMMARY OF THE INVENTION

The present invention has been made in view of the above circumstances, and an object thereof is to provide a pneumatic tire which suppresses generation of crack beginning at a wound-up end in a tire inner surface side of a chafer and is excellent in durability.

The object can be achieved by the following present invention. That is, the present invention provides a pneumatic tire including bead cores which are buried in bead portions, 5 rubber fillers which are arranged in outer sides in a tire diametrical direction of the bead cores, a carcass ply which is wound up from an inner side to an outer side around the bead cores, chafers which are wound up from an outer side to an inner side around the bead cores and are arranged so as to wrap the 10 carcass ply, and an inner liner rubber which is arranged in an inner side of the carcass ply, wherein an adhesive rubber having a higher modulus than the inner liner rubber is provided closer to the inner liner rubber side than the chafers between the carcass ply and the inner liner rubber, and the adhesive rubber is arranged 15 so as to cover inside wound-up ends of the chafers, and is provided with a thick portion which is thicker than the inner liner rubber, and thin portions which are arranged respectively in an inner side and an outer side in the tire diametrical direction of the thick portion and are thinner than the inner liner rubber.

The pneumatic tire according to the present invention is provided with the adhesive rubber having the higher modulus than that of the inner liner rubber in the side closer to the inner liner rubber than the chafer between the carcass ply and the 25 inner liner rubber. In the present invention, since the inside wound-up end of the chafer is covered with the thick portion of the adhesive rubber having the higher modulus, it is possible to effectively reduce the strain in the inside wound-up end of the chafer while suppressing the elongation of the inner liner 5 rubber. Accordingly, it is possible to suppress generation of the crack beginning at the wound-up end in the tire inner surface side of the chafer. Further, since the adhesive rubber is provided with the thin portions in each of the inner side and the outer side in the tire diametrical direction of the thick portion, it is possible to sufficiently secure the thickness of the inner liner rubber. As a result, it is possible to securely prevent transmission of gas which is filled in the tire.

In the pneumatic tire according to the present invention, it is preferable that the thickness of the adhesive rubber is greater than the thickness of the inner liner rubber, on a perpendicular line which is dropped from the inside wound-up end of the chafer to the tire inner surface. According to the above structure, it is possible to suppress generation of a crack beginning at the wound-up end in the tire inner surface side of the chafer.

In the pneumatic tire according to the present invention, it is preferable that the rubber filler is constructed by a lower filler which is adjacent to the bead core, and an upper filler which is arranged in an outer side in the tire diametrical direction of the lower filler and has a lower rubber hardness than the lower filler, and a thickness of the adhesive rubber is smaller than a thickness of the inner liner rubber on a perpendicular line which is dropped from an interface position between the lower filler and the upper filler to a tire inner surface.

Since the position of the interface between the lower filler and the upper filler is close to the height of a rim flange, the inner liner rubber is elongated greatly at an air filling time near the position of the interface. As a result, it is possible to securely prevent the transmission of the gas filled in the tire, by increasing the thickness of the inner liner rubber near the position of the interface.

In the pneumatic tire according to the present invention, it is preferable that a thickness of the adhesive rubber is smaller than a thickness of the inner liner rubber at a height which is 1.7 to 1.9 times a height of the wound-up end of the carcass ply based on a rim reference line.

At the height which is 1.7 to 1.9 times the height of the wound-up end of the carcass ply based on the rim reference line, the inner liner rubber is elongated most at the air filling time. As a result, it is possible to securely prevent the transmission of the gas filled in the tire, by increasing the thickness of the inner liner rubber near the height.

DETAILED DESCRIPTION OF THE PREFERRED EMBODIMENTS

Figure 1:
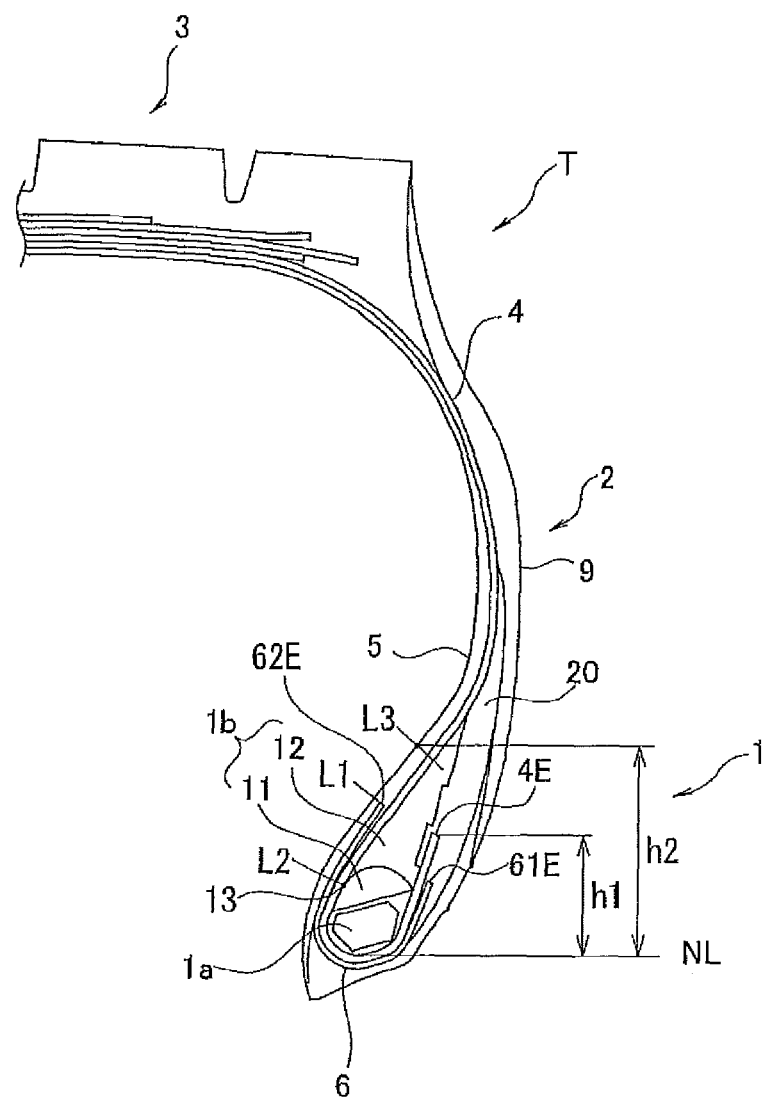
FIG. 1 is a tire meridian cross sectional view showing an example of a pneumatic tire according to the present invention.
Figure 2:
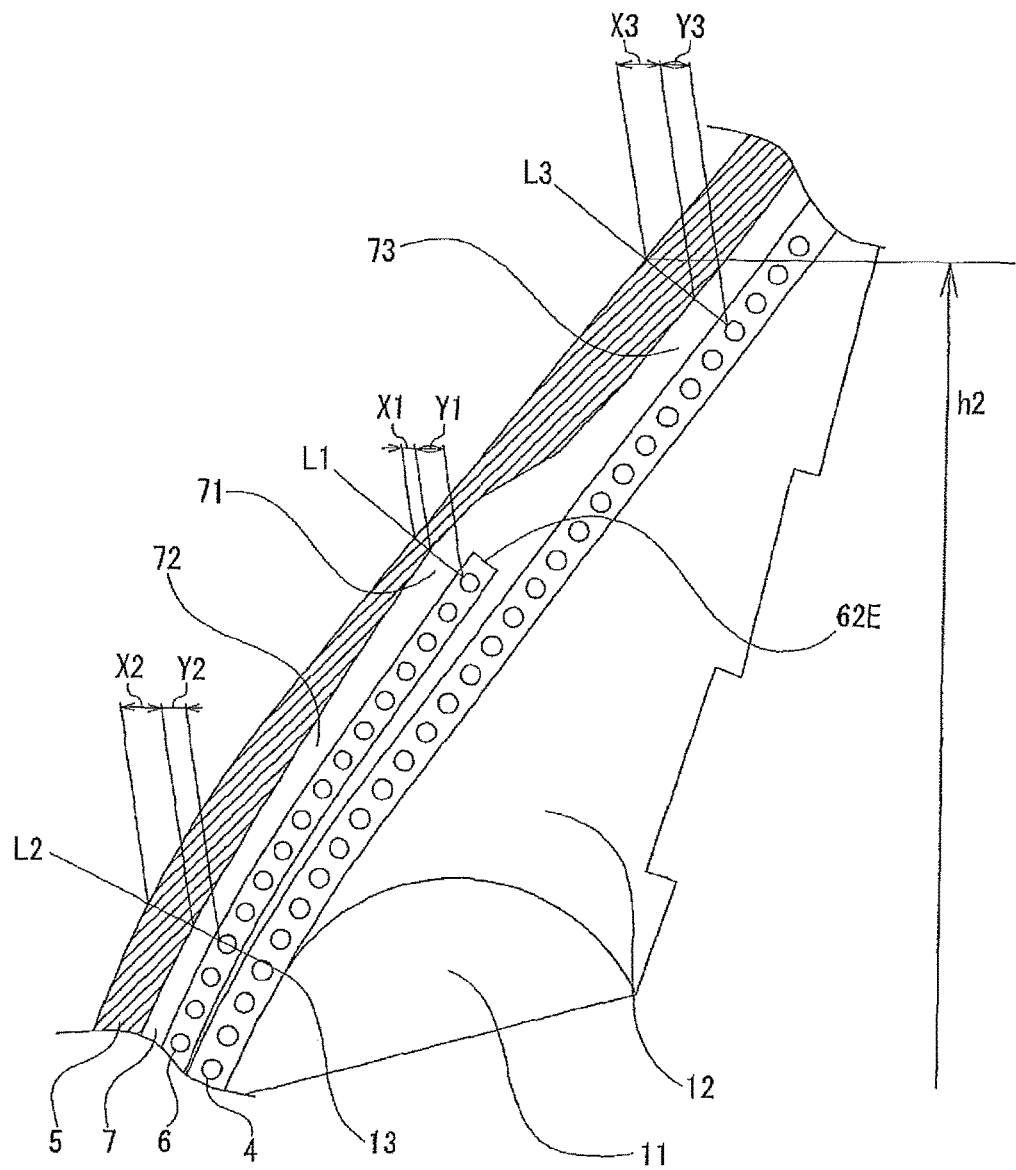
FIG. 2 is a cross sectional view showing a bead portion in an enlarged manner.
Figure 3:
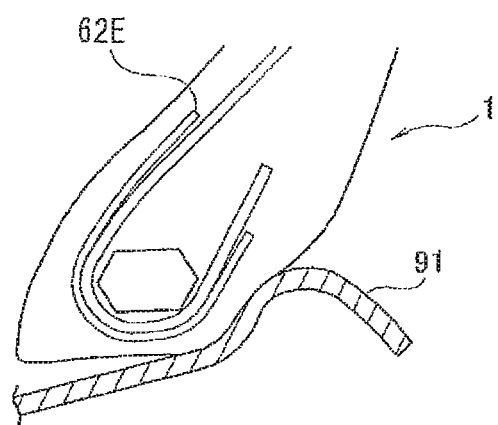
FIG. 3 is a diagram illustrating a protruding deformation of the bead portion.

A description will be given below of an embodiment according to the present invention with reference to the drawings. A tire T shown in FIG. 1 is an example of a pneumatic tire according to the present invention, and a tire meridian cross section at a specified rim installing time is shown. The specified rim installing time means a state in which the tire is installed to a rim specified in JATMA corresponding to a tire size, and a maximum pneumatic pressure corresponding to a single wheel maximum load capacity specified in JATMA is applied to the tire. FIG. 2 is a cross sectional view showing a bead portion 1 of the tire T in an enlarged manner.

The tire T is provided with a pair of bead portions 1, side wall portions 2 which extend outward in a tire diametrical direction from the bead portions 1, and a tread portion 3 which is connected to outside ends in the tire diametrical direction of the side wall portions 2 and forms a tread surface. An annular bead core 1a is buried in the bead portion 1, the bead core 1a being constructed by a convergent body obtained by laminating and winding a rubber coated bead wire. A rubber filler 1b is arranged in an outer side in the tire diametrical direction of the bead core 1a.

A carcass ply 4 extends between the bead cores 1a which are arranged in a pair of bead portions 1, and is wound up from an inner side to an outer side around the bead cores 1a. A wound-up portion of the carcass ply 4 is arranged in an outer side in a tire width direction of the bead core 1a and the rubber filler 1b, and a leading end thereof forms a wound-up end 4E. The carcass ply 4 is formed by coating a ply cord arranged in a direction which is approximately orthogonal to a tire circumferential direction, with a topping rubber. A steel cord and an organic fiber cord are preferably used as the ply cord.

An inner liner rubber 5 constructing an inner peripheral surface of the tire T is provided in an inner side of the carcass ply 4. The inner liner rubber 5 has a function of preventing transmission of gas which is filled in the tire. Further, a side wall rubber 9 constructing an outer wall surface of the tire T is provided in an outer side of the carcass ply 4 in the side wall portion 2.

A chafer 6 is wound up from an outer side to an inner side around the bead core 1a so as to be arranged in an outer side of the carcass ply 4. The chafer 6 according to the present embodiment is wound up from the outer side to the inner side so as to wrap the carcass ply 4. The chafer 6 is constructed by a steel chafer including a steel cord. The steel cord is arranged diagonally (for example, with an angle of inclination between 20 and 50 degrees) with respect to the tire circumferential direction, and is coated with the topping rubber.

The rubber filler 1b has a lower filler 11 which is adjacent to the bead core 1a and has a rounded cross section, and an upper filler 12 which is arranged in an outer side in the tire diametrical direction of the lower filler 11, and has a lower rubber hardness than the lower filler 11. An upper surface of the lower filler 11 is formed by a curved surface which is convex to an outer side in the tire diametrical direction. The upper filler 12 has a shape which is tapered toward the outer side in the tire diametrical direction, and a leading end of the upper filler 12 is arranged in an outer side in the tire diametrical direction than the wound-up end 4E of the carcass ply 4 and an outside wound-up end 61E of the chafer 6.

A reinforcing rubber 20 is provided between the rubber filler 1b and the side wall rubber 9 so as to pinch the wound-up end 4E of the carcass ply 4 and the outside wound-up end 61E of the chafer 6.

An adhesive rubber 7 (not shown in FIG. 1) having a higher modulus than the inner liner rubber 5 is provided closer to the inner liner rubber 5 side than the chafer 6 between the carcass ply 4 and the inner liner rubber 5. The adhesive rubber 7 is provided along an outer side of the inner liner rubber 5, and is adjacent to an inner side of the carcass ply 4 or the chafer 6. The adhesive rubber 7 is arranged so as to cover an inside wound-up end 62E of the chafer 6, therefore, it is possible to reduce a strain in the inside wound-up end 62E of the chafer 6, and suppress generation of a crack beginning at the inside wound-up end 62E.

The adhesive rubber 7 is provided with a thick portion 71 which is thicker than the inner liner rubber 5, and an inside thin portion 72 and an outside thin portion 73 which are respectively arranged in an inner side and an outer side in the tire diametrical direction of the thick portion 71 and have smaller thicknesses than the inner liner rubber 5. The inside wound-up end 62E of the chafer 6 is covered by the thick portion 71.

The thickness of the adhesive rubber 7 is the greatest in the vicinity of the inside wound-up end 62E of the chafer 6, and is gradually reduced toward the inner side and the outer side in the tire diametrical direction. The thickness of the adhesive rubber 7 is greater than the thickness of the inner liner rubber 5 in the thick portion 71, is reduced little by little toward the inner side and the outer side in the tire diametrical direction, and is smaller than the thickness of the inner liner rubber 5 in the inside thin portion 72 and the outside thin portion 73.

In the present embodiment, the thickness of the adhesive rubber 7 is greater than the thickness of the inner liner rubber 5 on a perpendicular line which is dropped from the inside wound-up end 62E of the chafer 6 to the tire inner surface. More specifically, on the assumption that a reference line L1 is formed by a normal line which is vertical to the tire inner surface, and passes through the inside wound-up end 62E of the chafer 6, a thickness Y1 of the adhesive rubber 7 is greater than a thickness X1 of the inner liner rubber 5 on the reference line L1. In other words, the reference line L1 traverses the thick portion 71.

A ratio X1/Y1 of the thickness X1 to the thickness Y1 is preferably between 0.6 and 0.9. In other words, it is preferable to satisfy a relationship $0.6 \leq X1/Y1 \leq 0.9$. Further, the thickness X1 of the inner liner rubber 5 is preferably between 1.2 and 2.5 mm. The thickness Y1 of the adhesive rubber 7 is preferably between 1.8 and 3.0 mm.

If a relationship $0.6 > X1/Y1$ is established, the thickness X1 of the inner liner rubber 5 is too small, and there is a risk of oxidation and deterioration since the transmission of the gas filled in the tire can not be prevented. On the other hand, if a relationship $X1/Y1 > 0.9$ is established, the thickness Y1 of the adhesive rubber 7 is too small, and a crack may be generated since adhesiveness is deteriorated.

In the present embodiment, the thickness of the adhesive rubber 7 is smaller than the thickness of the inner liner rubber 5 on a perpendicular line which is dropped from an interface position 13 between the lower filler 11 and the upper filler 12 to the tire inner surface. More specifically, on the assumption that a reference line L2 is formed by a normal line which is vertical to the tire inner surface, and passes through the interface position 13 between the lower filler 11 and the upper filler 12, a thickness Y2 of the adhesive rubber 7 is smaller than a thickness X2 of the inner liner rubber 5 on the reference line L2. In other words, the reference line L2 traverses the inside thin portion 72. The interface position 13 is set to an inner end in the tire width direction of the interface between the lower filler 11 and the upper filler 12.

A ratio X2/Y2 of the thickness X2 to the thickness Y2 is preferably between 1.2 and 1.5. In other words, it is preferable to satisfy a relationship 1.2 ≤X2/Y2 ≤1.5. Further, the thickness X2 of the inner liner rubber 5 is preferably between 1.8 and 3.0 mm. The thickness Y2 of the adhesive rubber 7 is preferably between 1.2 and 2.5 mm.

If a relationship 1.2>X2/Y2 is established, the thickness X2 of the inner liner rubber 5 is too small, and there is a risk of oxidation and deterioration since the transmission of the gas filled in the tire can not be prevented. On the other hand, if a relationship X2/Y2>1.5 is established, the thickness X2 of the inner liner rubber 5 is too great, and a disadvantage in cost is caused.

In the present embodiment, the thickness of the adhesive rubber 7 is smaller than the thickness of the inner liner rubber 5 at a height h2 which is 1.7 to 1.9 times a height h1 of the wound-up end 4E of the carcass ply 4 based on the rim reference line NL (bead base line). More specifically, on the assumption that a reference line L3 is formed by a normal line which is vertical to the tire inner surface, and passes through the inside inner surface which is positioned at the height h2 based on the rim reference line NL, a thickness Y3 of the adhesive rubber 7 is smaller than a thickness X3 of the inner liner rubber 5 on the reference line L3. In other words, the reference line L3 traverses the outside thin portion 73.

A ratio X3/Y3 of the thickness X3 to the thickness Y3 is preferably between 1.2 and 2.0. In other words, it is preferable to satisfy a relationship 1.2≤X3/Y3 ≤2.0. Further, the thickness X3 of the inner liner rubber 5 is preferably between 2.0 and 3.0 mm. The thickness Y3 of the adhesive rubber 7 is preferably between 1.0 and 2.5 mm.

If a relationship 1.2>X3/Y3 is established, the thickness X3 of the inner liner rubber 5 is too small, and there is a risk of oxidation and deterioration since the transmission of the gas filled in the tire can not be prevented. On the other hand, if a relationship X3/Y3>2.0 is established, the thickness X3 of the inner liner rubber 5 is too great, and a disadvantage in cost is caused.

A total thickness of the inner liner rubber 5 and the adhesive rubber 7 is preferably between 3.0 and 5.5 mm.

A modulus of the adhesive rubber 7 is higher than a modulus of the inner liner rubber 5. The modulus here is a value obtained by producing a sample while using a dumbbell 3 according to JIS K6251 so as to carry out a tension test and measuring a modulus (M300) (MPa) at the 300% extension time. A modulus $M300i$ of the inner liner rubber 5 and a modulus $M300s$ of the adhesive rubber 7 preferably satisfy a relationship $5.0 \leq M300s/M300i\ 7.0$. In other words, the modulus $M300s$ of the adhesive rubber 7 is preferably 5.0 to 7.0 times the modulus $M300i$ of the inner liner rubber 5. In the case that the moduli of the adhesive rubber 7 and the inner liner rubber 5 satisfy the relationship, an effect of reducing the strain in the inside wound-up end 62E of the chafer 6 is high, and an effect of suppressing the elongation of the inner liner rubber 5 is high.

The pneumatic tire according to the present invention is the same as the normal pneumatic tire except the matter that the thicknesses of the adhesive rubber and the inner liner rubber are structured as mentioned above, and the conventionally known materials, shapes, structures and manufacturing methods can be employed for the present invention.

Since the pneumatic tire according to the present invention is excellent in the durability of the bead portion, the pneumatic tire according to the present invention is useful for a pneumatic tire for a heavy load which is used in a vehicle having a heavy vehicle weight, such as a truck, a bus, an industrial vehicle, and a construction vehicle.

EXAMPLES

Since a durability test of the bead portion was carried out for specifically showing the structure and the effect of the present invention, a description will be given below. A size of a tire provided for the test is 275/80R22.5 151J, and the tire was installed to a rim having a size which is specified in JATMA.

In the durability test, the tire was traveled on a steel drum under a condition of an internal pressure 900 kPa and a speed 40 km/h, and was traveled for 168 hours while setting a load to 210% of JATMA normal condition, the load was increased 10% by 10% every 168 hours, and a traveling distance when any trouble was generated in the bead portion was evaluated. The durability is indicated by an index number on the assumption that a result of Comparative Example 1 is 100. The greater numerical value indicates the more excellent durability.

Comparative Example 1

In Comparative Example 1, the thickness of the inner liner rubber and the thickness of the adhesive rubber were fixed. The thickness X of the inner liner rubber was set to 0.7 times the thickness Y of the adhesive rubber. The modulus $M300s$ of the adhesive rubber was set to six times the modulus $M300i$ of the inner liner rubber. A result of evaluation is shown in Table 1.

Comparative Example 2

In Comparative Example 2, the thickness of the inner liner rubber and the thickness of the adhesive rubber were set as shown in Table 1. The modulus $M300s$ of the adhesive rubber was set to 0.5 times the modulus $M300i$ of the inner liner rubber, and the modulus of the adhesive rubber was set to be lower than the modulus of the inner liner rubber. A result of evaluation is shown in Table 1.

Comparative Example 3

In Comparative Example 3, the thickness of the inner liner rubber and the thickness of the adhesive rubber were set as shown in Table 1. In other words, the thick portion and the thin portion of the adhesive rubber were arranged inversely. The modulus $M300s$ of the adhesive rubber was set to six times the modulus $M300i$ of the inner liner rubber. A result of evaluation is shown in Table 1.

Examples 1 and 2

In Examples 1 and 2, the thickness of the inner liner rubber and the thickness of the adhesive rubber were set as shown in Table 1. The modulus $M300s$ of the adhesive rubber was set to six times the modulus $M300i$ of the inner liner rubber. A result of evaluation is shown in Table 1.

TABLE 1

|  | Comparative Example 1 | Comparative Example 2 | Comparative Example 3 | Example 1 | Example 2 |
|---|---|---|---|---|---|
| Thickness of inner liner rubber to thickness of adhesive rubber | X/Y = 0.7 | X2/Y2 = 1.5<br>X1/Y1 = 0.7<br>X3/Y3 = 2.0 | X2/Y2 = 0.7<br>X1/Y1 = 1.5<br>X3/Y3 = 0.7 | X2/Y2 = 1.5<br>X1/Y1 = 0.7<br>X3/Y3 = 2.0 | X2/Y2 = 1.2<br>X1/Y1 = 0.8<br>X3/Y3 = 1.2 |
| Modulus ratio (M300s/M300i) | 6.0 | 0.5 | 6.0 | 6.0 | 6.0 |
| Durability | 100 | 70 | 90 | 110 | 120 |

The following matters are known from the results in Table 1. The pneumatic tires according to Examples 1 and 2 are excellent in the durability in comparison with Comparative Example 1. In the case that the modulus of the adhesive rubber was made lower than the modulus of the inner liner rubber as Comparative Example 2, the durability was deteriorated. In the case that the relationship between the thickness of the inner liner rubber and the thickness of the adhesive rubber was set as Comparative Example 3, the strain became greater in the inside wound-up end of the chafer, and the durability was deteriorated.

What is claimed is:

1. A pneumatic tire comprising:
    bead cores which are buried in bead portions;
    rubber fillers which are arranged in outer sides in a tire diametrical direction of the bead cores;
    a carcass ply which is wound up from an inner side to an outer side around the bead cores;
    chafers which are wound up from an outer side to an inner side around the bead cores and are arranged so as to wrap the carcass ply; and
    an inner liner rubber which is arranged in an inner side of the carcass ply,
    wherein an adhesive rubber having a higher modulus at 300% elongation than the inner liner rubber is provided closer to the inner liner rubber side than the chafers between the carcass ply and the inner liner rubber, and the adhesive rubber is arranged so as to cover inside wound-up ends of the chafers, and is provided with a thick portion which is thicker than the inner liner rubber, a first thin portion which is arranged in an inner side of the thick portion in the tire diametrical direction and is thinner than the inner liner rubber, and a second thin portion which is arranged in an outer side of the thick portion in the tire diametrical direction and is thinner that the inner liner rubber,
    wherein the chafers are steel cord chafers and a thickness of the thick portion of the adhesive rubber is greater than a thickness of the inner liner rubber on a perpendicular line which is dropped from the inside wound-up end of the chafer at the diametrical center of the end of the steel cord therein to a tire inner surface,
    wherein each rubber filler is constructed by a lower filler which is adjacent to the bead core, and an upper filler which is arranged in an outer side in the tire diametrical direction of the lower filler and has a lower rubber hardness than the lower filler,
    wherein a thickness of the first thin portion of the adhesive rubber is smaller than a thickness of the inner liner rubber on a perpendicular line which is dropped from an axially inner interface position between the lower filler and the upper filler to a tire inner surface, and
    wherein a thickness of the second thin portion of the adhesive rubber is smaller than a thickness of the inner liner rubber on a perpendicular line which is dropped from the tire inner surface to the carcass ply and passes through the tire inner surface at a height which is 1.7 to 1.9 times a height of the wound-up end of the carcass ply based on a rim reference line.

* * * * *